Dec. 7, 1965 C. L. JULIAN ETAL 3,221,725
DISTRIBUTOR HAVING CENTRIFUGAL ADVANCE AND RETARD
Filed March 16, 1964 4 Sheets-Sheet 1

INVENTORS
Clarence L. Julian
Robert E. Young
BY
C. R. Meland
Their Attorney

INVENTORS
Clarence L. Julian
Robert E. Young
BY
C. R. Meland
Their Attorney

# United States Patent Office 3,221,725
Patented Dec. 7, 1965

3,221,725
DISTRIBUTOR HAVING CENTRIFUGAL ADVANCE AND RETARD
Clarence L. Julian, Middletown, and Robert E. Young, Anderson, Ind., assignors to General Motors Corporation, Detroit, Mich., a corporation of Delaware
Filed Mar. 16, 1964, Ser. No. 352,014
8 Claims. (Cl. 123—146.5)

This invention relates to ignition spark control devices and more particularly to a device that works in conjunction with an internal combustion engine ignition distributor and causes a spark to be retarded as a supercharged engine passes through a speed range that could normally cause detonation.

In engines of the supercharged variety, a detonation range will exist durnig acceleration of the engine as the supercharger begins to pressurize the induction system. Detonation, as herein referred to, is an explosive effect of a combustible mixture that is highly compacted in the induction system of an internal combustion engine by means of a supercharger and is further compacted during the compression stroke of said engine. During the operation of such an engine through a speed range of approximately 2000 r.p.m. to 3900 r.p.m., this highly compacted material will tend to pre-ignite and fire in the cylinder before the piston reaches top dead center. This situation would ensue if the spark control mechanism common to internal combustion engines were allowed to function in its normal manner. In other words, a spark would normally be in an advanced state during the speed range mentioned using well-known devices, and this combination of an advanced spark and the highly compressed combustible mixture would cause the combustible mixture to explode prematurely. It should be noted that, during other ranges of operation of a supercharged internal combustion engine, an advanced spark is desirable. It is possible to control detonation by returning the ignition spark, that is, to delay the time at which a spark plug fires. As previously mentioned, certain speed ranges of such an engine require a normally advancing spark so, therefore, a problem exists in providing a spark control device that will normally advance the spark during an increasing engine speed, but which will selectively retard the spark during a detonation range.

Therefore, it is an object of the present invention to provide a very simple an inexpensive method of controlling the spark in a suitable manner for operation with a supercharged internal combustion engine.

It is another object of the present invention to provide a spark control device that can be used with distributors and ignition systems of common design.

It is still another object of the present invention to provide a spark control device, acceptable for use with supercharged internal combustion engines, that is responsive to the speed of the engine.

It is yet another object of the present invention to provide a spark control device that will first retard the ignition spark and later advance the ignition spark during a period of increasing engine r.p.m.

It is a further object of the present invention to provide a centrifugal means of retarding and advancing the ignition spark without radically changing the design or function of a typical ignition distributor.

It is still a further object of the present invention to provide a device that can vary the ignition spark of an internal combustion engine of the supercharged variety so that destructive detonation will not occur in a speed range where, but for this invention, such detonation would occur.

Further objects and advantages of the present invention will be apparent from the following description, reference being had to the accompanying drawings wherein a preferred embodiment of the present invention is clearly shown.

Figure 1:
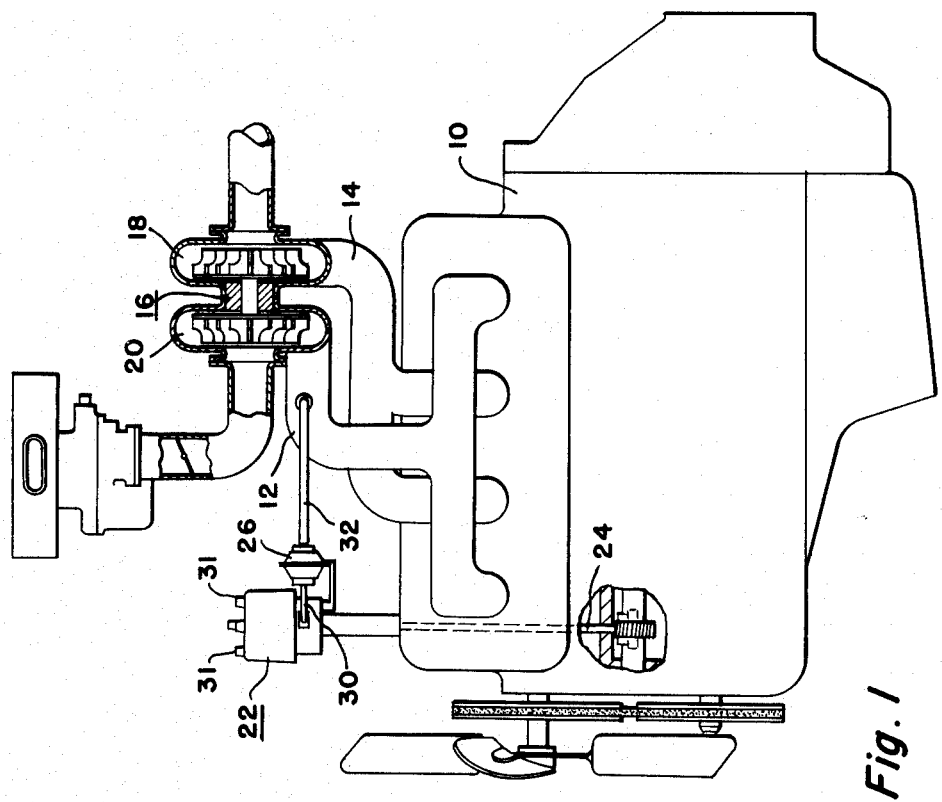
FIGURE 1 illustrates an internal combustion engine with an exhaust driven supercharger, certain portions being shown with parts broken away.

Referring now to FIGURE 1, an internal combustion engine 10 is shown having mounted thereon an intake manifold 12 and an exhaust manifold 14. The supercharger 16 is rotatably mounted so that a driving portion 18 is located in a portion of the exhaust manifold 14 and a driven portion 20 is located in a portion of the intake manifold 12. A distributor, generally designated by the numeral 22, is mounted on the internal combustion engine 10 and has a drive shaft 24 extending into the engine and drivably engaged by a portion of the engine illustrated in the broken away portion. The vacuum control unit 26 is operatively associated with a breaker plate 28, best seen in FIGURE 2, through a drive link 30, best seen in FIGURE 3. The vacuum control unit 26 is in fluid communication with the intake manifold 12 through a vacuum line 32.

Figure 2:
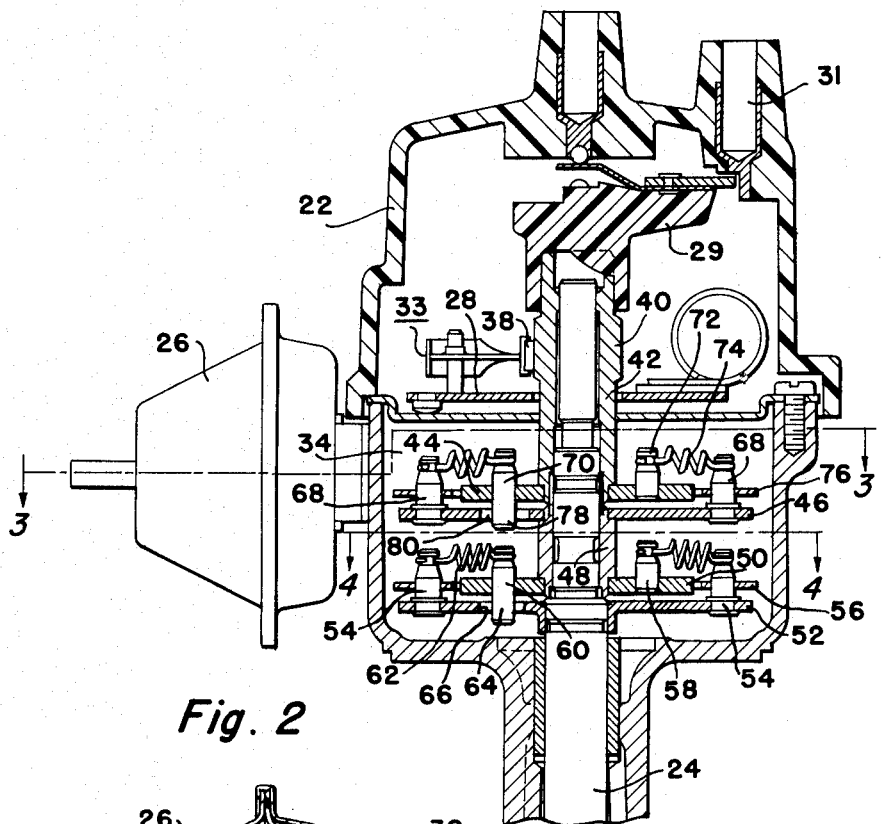
FIGURE 2 is a sectional view of the distributor shown in FIGURE 1.

Referring now to FIGURE 2, a compartment 34, located below the breaker plate 28, houses the subject spark control device. The distributor shown is of common design wherein a rotor 29, carried by the drive shaft 24, distributes ignition voltage from a coil, not shown, to a series of terminals 31 arranged circumferentially around said drive shaft, at a time determined by the spark control means. A breaker point assembly 33 carried by the breaker plate 28 includes a rubbing block 38 cooperating with a breaker cam 40 to open and close the breaker points sequentially during rotation of the drive shaft 24. The breaker cam or sequencing means 40 has a sleeve extension 42 engaging a cam 44. The sleeve extension 42 is mounted on the drive shaft 24 and adapted for rotational movement therearound. A plate 46 is mounted on one end of a sleeve 48. A cam 50 is mounted at the lower end of the sleeve 48 and it is therefore seen that the advancing cam plate 46, the sleeve 48 and the cam 50 constitute one unit. The sleeve 48 is adapted for rotational movement around the drive shaft 24. A plate 52 is firmly attached to the drive shaft 24 in a manner that prevents relative movement therebetween.

Figure 4:
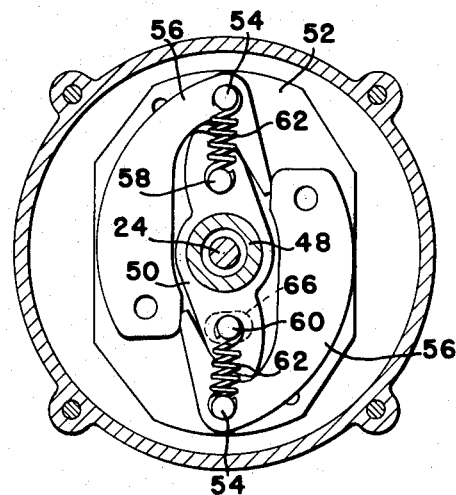
FIGURE 4 is a sectional view taken along line 4—4 of FIGURE 2.

Referring now to FIGURE 4, the method of engagement between the retarding cam plate 52 and the drive cam 50 is shown more clearly. The retarding cam plate 52 carries a pair of pivot pins 54 around which a pair of weights 56 are mounted for pivotal movement. The drive cam 50 carries spring retaining pins 58 and 60. A pair of springs 62 keep the cam 50 in biased engagement with the weights 56.

As best seen in FIGURE 2, the spring retaining pin 60 has as extension 64 extending downwardly and engaging an arcuate slot 66 in the retarding cam plate 52 to limit the relative movement between the drive cam 50 and the retarding cam plate 52.

Figure 3:
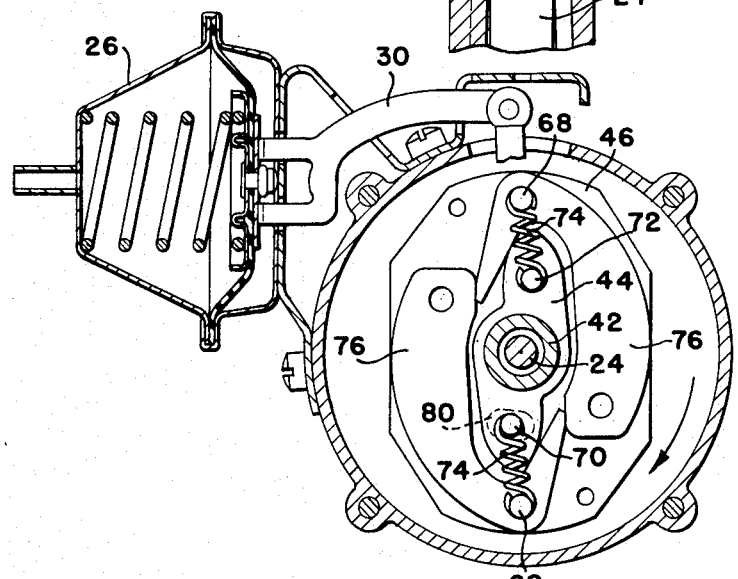
FIGURE 3 is a sectional view taken along line 3—3 of FIGURE 2.

Referring now to FIGURE 3, the advancing cam plate 46 carries a pair of pivot pins 68. The drive cam 44 likewise carries a spring retaining pin 70 and a spring retaining pin 72 on opposite ends. A pair of springs 74 keep the cam 44 and the weights 76 in biased engagement through their engagement with the pivot pins and the spring retaining pins. A pair of weights 76 are pivotally mounted on the pivot pins 68. The spring retaining pin 70 has an extension 78 extending downwardly from the drive cam 44 into an arcuate slot 80 in the advancing cam plate 46 to establish a limit for relative movement between the drive cam 44 and the advancing cam plate 46. This pin and slot arrangement is best seen in FIGURE 2.

In operation, an internal combustion engine 10, such as viewed in FIGURE 1, is operating in an idling condition, for example, approximately 500 r.p.m. As the engine is accelerated, the intake manifold 12 is under vacuum and, consequently, the vacuum control unit 26, through linkage previously described, causes the breaker plate 28 to move relative to the cam 40 to provide a spark advance situation. This cooperation of parts is old in the art and is not meant to be included in this invention. However, in view of its common usage, its inclusion is necessary to describe the cycle of events in an engine of the type described leading up to the need for the subject device.

Figure 5:
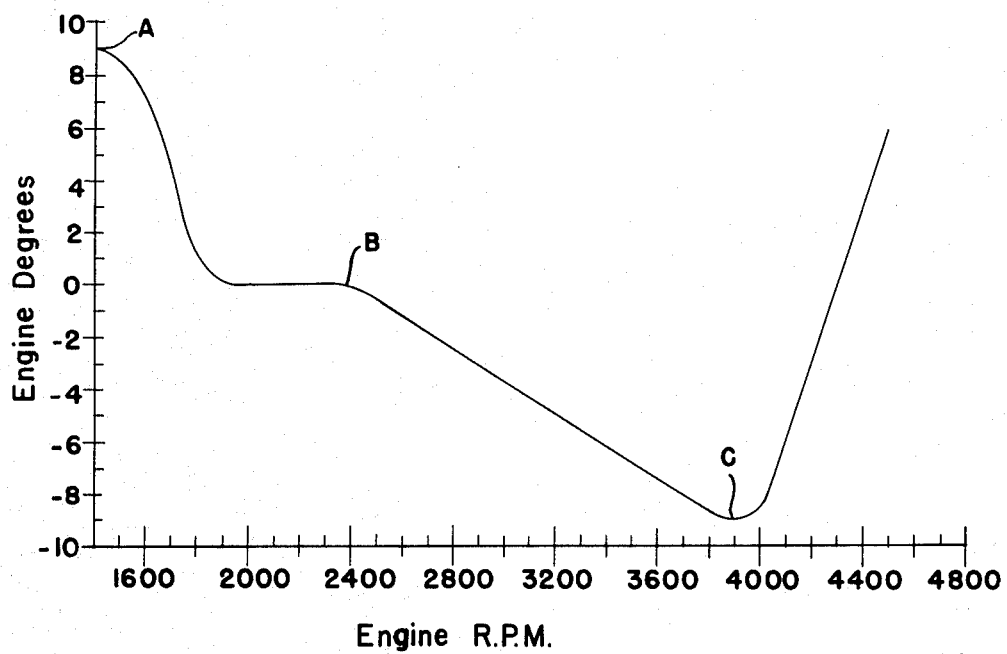
FIGURE 5 illustrates a typical spark retard-advance curve that would be generated utilizing the subject device.

As the engine is accelerated above 500 r.p.m., the exhaust manifold passes an increasingly greater amount of exhaust gases. As these exhaust gases pass through the driving portion of the turbine or supercharger 16, it is caused to speed up and, in turn, the driven portion 20 causes an increasingly positive pressurization of the intake manifold 12. During the early stages of acceleration of said engine, the intake manifold will be tending, therefore, towards an increasing vacuum condition due to the normal action of the pistons, and tending towards a positive pressurization condition due to the driven portion 20 of the supercharger 16 developing greater pressure. At an indeterminate point at higher engine speeds, under normal operating conditions, the pressurization effect of the supercharger will begin to offset the vacuum and cause a tendency towards positive pressurization of the intake manifold 12. It will be assumed for purposes of this explanation of operation that this point occurs at 1500 r.p.m. and, accordingly, point A on the graph in FIGURE 5 is reached.

Figure 6:
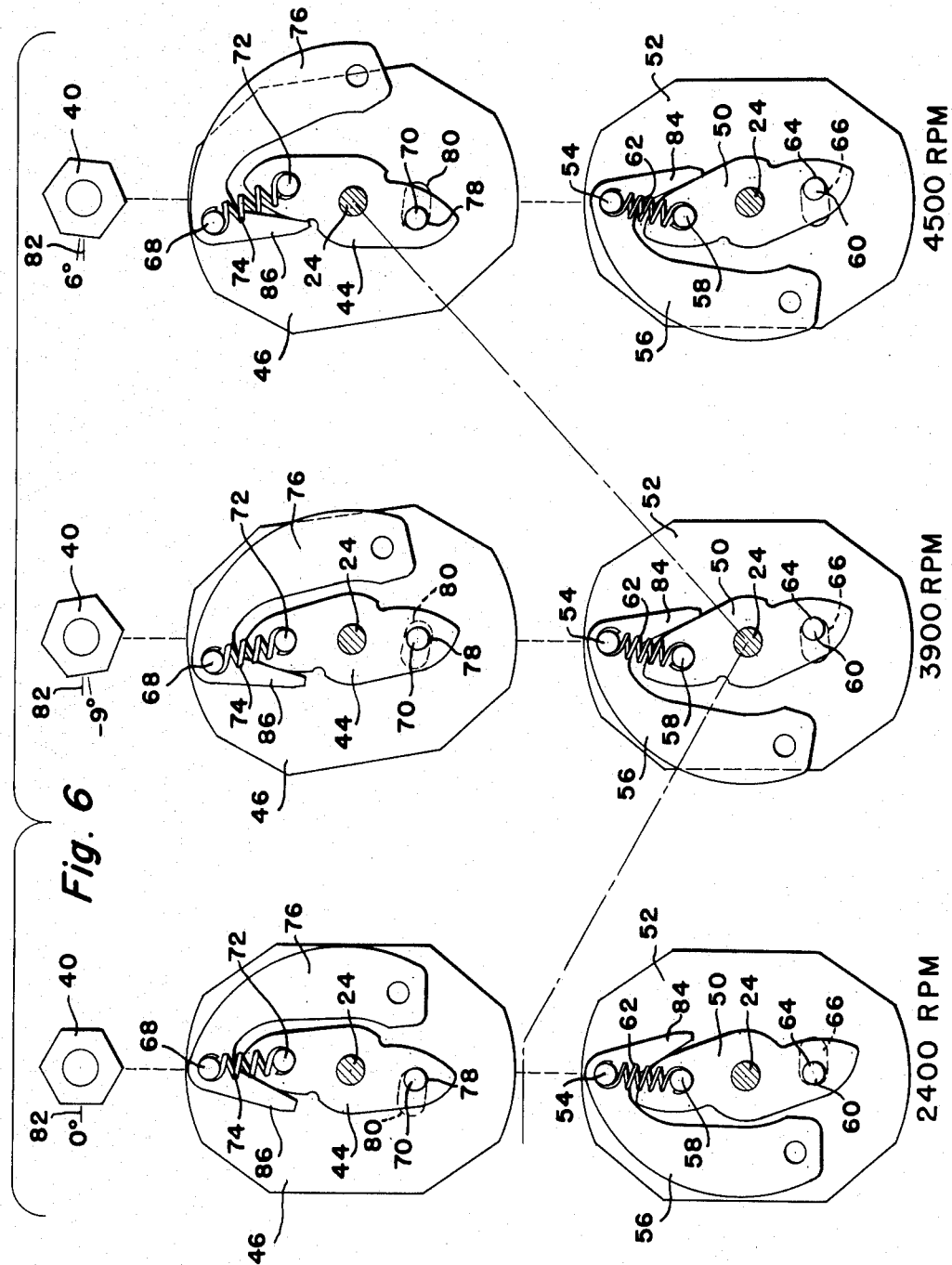
FIGURE 6 illustrates the progressive position of the subject device during a period of increasing engine r.p.m.

At this point in operation, the supercharger has not yet reached its maximum output. As the r.p.m. of the engine increases towards 2000 r.p.m., the retarding effect due to the vacuum advance unit losing vacuum causes the spark to be retarded to 0°. This condition will continue for a short period of time until the engine reaches a speed of approximately 2400 r.p.m. This point is represented by point B in the graph of FIGURE 5 and the configuration of the weights and cams of the subject device is illustrated in FIGURE 6 in the column labeled 2400 r.p.m. It should be noted that in FIGURE 6, one of the weights and one of the springs has been eliminated from the drawing to more clearly show the operation of the subject device but it is understood that these weights and springs will be positioned substantially as they are shown in FIGURES 3 and 4 during operation of the engine described.

As is seen in the column entitled 2400 r.p.m. in FIGURE 6, the spring 74 is of a heavier variety than the spring 62. Also, it should be noted that the pin extension 78 of the spring retaining pin 70 is substantially right of center in the arcuate slot 80 and the extension 64 of the spring retaining pin 60 is substantially left of center in the arcuate slot 66. Also, the breaker cam 40 is shown at 0°, that is, a no-advance or retard position relative to a reference line 82.

As the engine increases into a medium range of speeds, for example, between 2400 r.p.m. and 3900 r.p.m., the supercharger operates most efficiently. This efficient operation of the supercharger results in a maximum compaction of the molecules of the combustible mixture. This maximum compaction by the supercharger is assisted by the piston of the engine in compressing the combustible mixture to a point where detonation is likely to occur. Therefore, during this range of engine speeds, it is important to delay the firing of the spark plug to overcome the propensity of an engine operating in this range to detonate. This result is brought about in the subject device by use of the centrifugal mechanisms hereinafter described.

Referring now to FIGURE 6 and the column entitled 3900 r.p.m., an illustration of the relative positions of the advancing cam plate 46 and the retarding cam plate 52 is shown. During this phase of engine operation, up to approximately 3900 r.p.m., the retarding cam plate and the drive cam 50 still dominate the spark control. This is due primarily to the fact that the springs 74 have a greater spring constant than the springs 62 and, therefore, the weight 76 has not been allowed to swing out as far from the drive cam 44 as the weight 56 has been allowed to swing out from the drive cam 50. Therefore, it is seen that a toe portion 84 of the weights 56 has levered the drive cam 50 a greater amount counterclockwise than a toe portion 86 of the weights 76 has levered the drive cam 44 in a clockwise direction. The net result of the opposite rotations just described is 9° of spark retard. This amount of spark retard is illustrated by a counterclockwise movement of the breaker cam 40 in relation to the reference line 82 shown in the uppermost portion of the column entitled 3900 r.p.m. This point is illustrated by the lowest point of the curve in FIGURE 5 and designated as point C.

As the engine speed increases into a high range of speeds, for example, above 3900 r.p.m., the speed of the engine, and, consequently, the speed of the pistons, creates a shorter time in which the combustible mixture can be burned. The volume of combustible mixture and its compression remains relatively stable during this range of engine speeds and, therefore, it becomes desirable to advance the ignition spark and begin the burning of the combustible mixture earlier than previously desired.

It should be noted that at approximately 3900 r.p.m., as the drive cam 50 was moved in a counterclockwise direction, the extension 64 of the spring retaining pin 60 carried by the drive cam 50 was likewise moved in the counterclockwise direction until it abutted one end of the arcuate slot 66. This movement of the extension 64 ends the relative movement between the retarding cam plate 52 and the drive cam 50. As previously described, the retarding cam plate 52 firmly engaged the drive shaft 24 with no relative movement therebetween. Now, as the relative movement between the drive cam 50 and the retarding cam plate 52 ceases, it becomes apparent that the advancing cam plate 46, being engaged by the drive cam 50 through the sleeve 48, likewise is prevented from any further movement relative to the plate 52. This establishes a firm base from which the breaker cam 40 can be moved. It should also be noted at this point that the plate 46 and the cam 44 have been carried in a counterclockwise direction due to the engagement of the plate 46 to the cam 50 through the sleeve 48.

Referring again to FIGURE 6 and the weight and cam configuration in the column entitled 4500 r.p.m., the drive cam 50 and the retarding cam plate 52 are shown in the same relative position that they were in during the previous speed range illustrated in the column entitled 3900 r.p.m. However, at this point, the tendency of the weights 76 is to lever the drive cam 44 in a clockwise direction relative to the plate 46. Therefore, the weights 76 continue to generate centrifugal force above 3900 r.p.m. and continue to lever the drive cam 44 in a clockwise direction. This clockwise motion of the drive cam 44 carries the extension 78 of the spring retaining pin 70 in a clockwise movement through the arcuate slot 80. This clockwise movement will be limited by the extension 78 contacting the leftward edge of the arcuate slot 80 as viewed in FIGURE 6. This clockwise movement of the drive cam 44 has moved the breaker cam 40 also in a clockwise direction due to its engagement therewith.

Therefore, the breaker cam 40 has been acted upon to result in a net spark advance of 6° as is illustrated by the movement of the cam 40 relative to the reference line 82 as seen in FIGURE 6. It should be understood that the r.p.m. ranges herein used and number of degrees of spark advance and retard are illustrative in nature and in no way limit the functioning of the subject device to these ranges.

The utility of this spark control device is evident from the fact that any engine having a supercharger, regardless of the horsepower rating of the engine or of the design of the supercharger, has a range of speed operation where the supercharger becomes most efficient and the extreme compaction of the combustible mixture occurs. This extreme compaction of molecules of the combustible mixture will necessarily result in the tendency of said mixture to ignite due to compression alone. In view of the fact that no means has been devised to effectively vary the quantity or volume of the combustible mixture during such a speed range, the only practical method of overcoming the detonation propensity of the supercharged engine is to retard the ignition spark during such a period.

Also, in view of the high production techniques normally utilized in the manufacture of automotive parts, it becomes very desirable to maintain a standardization of parts between engines of different designs having common functional components. This invention operates within the bounds of manufacturing desirability in that the components used are very similar to the design and function of parts used in conventional engines. The unique arrangement of parts brings about the solution to the problem of detonation of the type normally present in supercharged engines as well as maintaining a desirable standardization of parts.

While the embodiment of the present invention, as herein disclosed, constitutes a preferred form, it is to be understood that other forms might be adopted.

What is claimed is as follows:

1. An ignition spark control device comprising: spark advance means responsive to pressure in an engine intake manifold that is negatively pressurized under low engine speed and low engine load conditions, said spark advance means responsive to higher loads to retard the ignition spark from a previously established advance point; spark retard means including centrifugal means for retarding the ignition spark from a point established by the spark advance means responsive to intake manifold pressure to a further retarded point during conditions of increasing engine speed, said spark retard means being limited to a predetermined amount of spark retard; and spark advance mechanism responsive to an increased engine speed to advance the spark from the limit of retard to a limit of advance as the engine speed increases to its limit.

2. An ignition spark control device comprising: a shaft driven at a speed proportional to engine speed; cam means carried for rotation by said shaft and rotatable with respect thereto under certain operating conditions; first plate means carried by said shaft and adapted to rotate therewith; second plate means carried by said cam means and adapted to be rotatable therewith with respect to said shaft; breaker point means for distributing an ignition spark to a vehicle engine; first weight means carried by said second plate means; second weight means carried by said first plate means; and vacuum responsive means engaging a support for said breaker point means to vary the angular disposition of said breaker point means relative to said cam means during a period of engine load increase from a no load condition to a partial load condition; said first weight means responsive to engine speed as the engine accelerates into a low speed range to retard the ignition spark from the point of ignition advance brought about by the vacuum responsive means, said first weight means continuing the response to engine speed after an increase of engine speed through a low speed range wherein the vacuum responsive means is ineffective to produce a further ignition advance, said second weight means responsive to an even higher engine speed when going toward a full speed condition to take over spark control from said first weight means as inherently limited after transition through a partial speed condition to continue ignition spark advance by reversely rotating said cam means as the engine approaches maximum speed, said vacuum responsive means and said first weight means cooperating to bring about an initial advance and subsequent retard of the ignition spark, said second weight means acting independently of said vacuum responsive means and said first weight means to advance the igntion spark as engine speed approaches maximum values.

3. A spark control device for a supercharged engine having a detonation propensity in the medium speed ranges, said spark control device comprising: a distributor having an engine driven drive shaft and providing a housing for said device; a sleeve and cam formed thereon rotatably carried on an end of said drive shaft; breaker points and support plate rotatably carried with respect to said sleeve and cam on said drive shaft; a breaker support plate connected actuator means responsive to pressure in the engine intake manifold to vary the radial position of said breaker support plate relative to said sleeve and cam during a low load range to advance the ignition spark and retarding the ignition spark during a load range between low and medium ranges; a first plate rotatably carried by said drive shaft and carrying first weights biased by a spring of a predetermined strength so as to be responsive to centrifugal force of a low magnitude to assist said actuator means in retarding the ignition spark as medium speed ranges are encountered; and a second plate and second weights thereon carried by said sleeve and cam rotatably with respect to said first plate, said second weights being responsive to a greater centrifugal force and biased by a spring of greater predetermined strength than said first weights to vary the position of said cam relative to said breaker points during a higher speed range thereby advancing the spark during higher than medium speed ranges from the point determined by said first plate and weights during medium speed ranges.

4. An ignition spark timing control device for internal combustion engine comprising: a first spark advancing means responsive to engine speed over a part of the range of engine operating speeds; spark retarding means responsive to engine speeds over another part of the range of engine operating speeds; and intake manifold vacuum responsive means including a throttle controlled inlet and means responsive to engine charging pressure to advance the spark during pressure conditions indicating low load on the engine and to progressively retard the spark during pressure conditions indicating increasing load on the engine in the low load to medium load range, said spark retarding and said spark advancing means adapted to operate independently and consecutively as engine speed increases and within a range of engine speeds from middle to top engine speeds as engine load proportionally increases, said spark retarding and said first spark advancing means each separately acting as a predominant spark control in separate engine speed ranges sequentially during a period of ever increasing engine speed and load to full speed and full load from substantially a no load condition at idle speed.

5. The combination of an engine driven distributor for an internal combustion engine and a spark control device, said distributor including breaker point means, a breaker cam means rotatable with respect to said breaker point means and adapted to engage said breaker point means to open and close said breaker point means, and vacuum responsive means adapted to move said breaker point means relative to said rotatable cam means thereby advancing the ignition spark during a low load range of the engine, said spark control device comprising; a plurality of weight means circumferentially mounted around said drive means and being responsive to engine speed, resilient means, a plurality of cam means being engageably driven by said distributor drive means through the resilient means, and tiered plate means disposed around said distributor drive means and rotatably carrying said cam means, a first of said plurality of weight means responsive to engine speed and in cooperation with said vacuum responsive means being adapted to lever said breaker cam means in a first direction relative to said breaker point means thereby retarding said ignition spark to a predetermined limit during a range of partial engine loads, a second of said plurality of weight means responsive to engine speed being adapted to lever said breaker cam means in a second direction relative to said breaker point means toward a limit of advance during a high speed range of the engine thereby advancing said ignition spark during said high range of engine speeds.

6. The combination of an engine driven ignition distributor for a supercharged internal combustion engine having a detonation range, and a spark control device, said distributor including a breaker point means for advancing and retarding the timing of the ignition spark of said engine in response to pressure in the intake manifold of the engine during a low range of engine loads, a breaker cam means being adapted to open and close said breaker point means in a predetermined sequence, a distributor drive means adapted for rotational movement, and vacuum means responsive to engine manifold pressure to move said breaker point means relative to said distributor driving means to bring about a spark advance during one range of engine loads and to remove a previously created advance during a higher range of engine loads; and said spark control device comprising; a series of drive cams engaged for rotational movement by said drive means, a series of cam plate means circumferentially mounted around said distributor drive means in tiered fashion, a plurality of weights pivotally mounted on said series of cam plate means and being in biased engagement with said series of drive cams, said plurality of weights generating centrifugal force during a medium speed of rotational movement of the distributor drive means, said plurality of weights having portions arranged to transmit said centrifugal force to said drive cams, a first pair of said plurality of weights being adapted to lever a first of said drive cam means away from a first of said cam plates thereby causing said breaker cam to move in an opposite direction relative to said drive means during a medium range of engine speeds thereby retarding the ignition spark below a point accomplished by said breaker point means, a second pair of said plurality of weights being adapted to lever a second of said plate means away from a second of said cam means and causing said breaker cam to move in the same direction relative to said drive means thereby advancing the ignition spark during a high range of engine speeds, said selective retarding and advancing of the ignition spark causing said supercharged engine to operate efficiently during a detonation range in medium engine speeds.

7. An ignition spark control device comprising: first spark advance means responsive to engine load from a no load to a part load condition to advance ignition spark and losing effectiveness as the spark advance means during an increase in engine load above part load conditions; spark retard means responsive to engine speed during a transition from part throttle opening to medium throttle opening to retard the ignition spark to a predetermined limit in cooperation with said first spark advance means as it loses effectiveness during engine load increase; and second spark advance means responsive to engine speed during a transition from medium throttle opening to full throttle opening to advance the ignition spark from the limit of retard as previously established by fully reacted spark retard means and first spark advance means to a predetermined limit for effective high speed operation.

8. An ignition spark timing control device for internal combustion engines having an intake manifold supercharger responsive to engine speeds, said ignition spark timing control device comprising: first spark advance means including a vacuum servo motor responsive to intake manifold pressure; an engine driven drive shaft, first plate means carried by said drive shaft for rotation therewith; second plate means carried by a sleeve adapted for rotation with said drive shaft under one set of operating conditions and adapted to be rotatable with respect thereto during another set of operating conditions; sleeve means carried for rotation with respect to said drive shaft during one set of operating conditions and adapted to rotate therewith during another set of operating conditions, said sleeve having a breaker cam integrally formed therewith; third plate means carrying an ignition breaker point arranged to cooperate with said sleeve carried cam and movable in response to pressure changes in the intake manifold to advance the ignition spark during a no load to low load set of operating conditions and serving to be reversely rotatable during operating conditions when the intake manifold is increasingly pressurized by the supercharger to retard the ignition spark; first weight means rotatably carried by said first plate means and arranged to move said first plate means and said second plate means in response to an increase in engine speed to supplement the spark retard generated by said increasingly pressurized manifold to a predetermined limit of spark retard; and second weight means rotatably carried by said second plate means and being responsive to an increase in engine speed to reversely rotate said sleeve carried cam relative to said breaker points to effect an ignition spark advance from the point of retard previously established by the cooperation of said first weight means and the increasingly pressurized manifold, said first weight means drivably engaging said first plate means by a spring having a predetermined magnitude sufficient to make said first weight means responsive to a medium range of engine speeds, said second weight means drivably engaging said second plate means through a spring having a greater force than said first mentioned spring thereby making said second weight means responsive to a higher range of engine speeds than said first weight means.

References Cited by the Examiner

UNITED STATES PATENTS

| | | | |
|---|---|---|---|
| 1,807,624 | 6/1931 | Hittle | 123—117.1 |
| 2,086,693 | 7/1937 | Arthur | 200—22 |
| 2,217,364 | 10/1940 | Halford et al. | 123—117.1 X |

FOREIGN PATENTS

| | | |
|---|---|---|
| 613,459 | 11/1948 | Great Britain. |
| 613,546 | 11/1948 | Great Britain. |

MARK NEWMAN, *Primary Examiner.*

RICHARD B. WILKINSON, *Examiner.*